United States Patent
Solodky et al.

(10) Patent No.: US 11,391,829 B2
(45) Date of Patent: Jul. 19, 2022

(54) PIECEWISE HYPERBOLIC WAVEFORM FOR CODE DIVISION MULTIPLE ACCESS RADAR SYSTEM OPERATION

(71) Applicant: GM Global Technology Operations LLC, Detroit, MI (US)

(72) Inventors: Gaston Solodky, Kfar Saba (IL); Oren Longman, Tel Aviv (IL); Shahar Villeval, Tel Aviv (IL); Igal Bilik, Rehovot (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 287 days.

(21) Appl. No.: 16/567,414

(22) Filed: Sep. 11, 2019

(65) Prior Publication Data
US 2021/0072367 A1    Mar. 11, 2021

(51) Int. Cl.
| | | |
|---|---|---|
| *G01S 13/34* | (2006.01) | |
| *H01Q 1/32* | (2006.01) | |
| *H01Q 21/00* | (2006.01) | |
| *G01S 13/00* | (2006.01) | |
| *G01S 7/02* | (2006.01) | |

(52) U.S. Cl.
CPC ............ *G01S 13/003* (2013.01); *G01S 7/023* (2013.01); *G01S 7/0232* (2021.05); *G01S 7/0234* (2021.05); *G01S 13/34* (2013.01); *G01S 13/342* (2013.01); *G01S 13/343* (2013.01); *H01Q 1/3233* (2013.01); *H01Q 21/0025* (2013.01)

(58) Field of Classification Search
CPC ...... G01S 13/34; G01S 13/342; G01S 13/343; H01Q 1/3233; H01Q 21/0025
See application file for complete search history.

(56) References Cited

U.S. PATENT DOCUMENTS

| | | | | |
|---|---|---|---|---|
| 7,880,672 | B1 * | 2/2011 | Doerry | G01S 7/282 |
| | | | | 342/201 |
| 9,730,219 | B2 * | 8/2017 | Rambach | G01S 13/931 |
| 10,126,418 | B1 * | 11/2018 | Campbell | G01S 13/931 |
| 11,054,516 | B2 * | 7/2021 | Wu | G01S 7/354 |
| 2015/0204972 | A1 * | 7/2015 | Kuehnle | G01S 13/42 |
| | | | | 342/156 |
| 2017/0160380 | A1 * | 6/2017 | Searcy | G01S 13/288 |
| 2017/0227639 | A1 * | 8/2017 | Stokes | G01S 15/104 |
| 2020/0182991 | A1 * | 6/2020 | Hakobyan | G01S 13/343 |

OTHER PUBLICATIONS

C. Gao, K. C. Teh and A. Liu, "Piecewise Nonlinear Frequency Modulation Waveform for MIMO Radar," in IEEE Journal of Selected Topics in Signal Processing, vol. 11, No. 2, pp. 379-390, Mar. 2017, doi: 10.1109/JSTSP.2016.2616108. (Year: 2017).*

* cited by examiner

*Primary Examiner* — Erin F Heard
*Assistant Examiner* — Ismaaeel A. Siddiquee
(74) *Attorney, Agent, or Firm* — Cantor Colburn LLP

(57) ABSTRACT

Methods and systems involve generating a family of codewords. Each codeword of the family of codewords including three segments with one of the three segments being a hyperbolic frequency modulation (HFM) segment and two of the three segments being linear frequency modulation (LFM) segments. A method includes transmitting each codeword of the family of codewords using a different transmit antenna element.

16 Claims, 4 Drawing Sheets

$$x_m(t) = \begin{cases} x_{\text{LFM}_m}(t, \alpha), & 0 \leq t < \dfrac{M-C(m)}{2M}T \\ x_{\text{HFM}_m}(t), & \dfrac{M-C(m)}{2M}T \leq t < \dfrac{M+C(m)}{2M}T \\ x_{\text{LFM}_m}(t, \alpha), & \dfrac{M+C(m)}{2M}T \leq t < T \end{cases}$$

FIG. 4

PIECEWISE HYPERBOLIC WAVEFORM FOR CODE DIVISION MULTIPLE ACCESS RADAR SYSTEM OPERATION

The subject disclosure relates to a piecewise hyperbolic waveform for code division multiple access (CDMA) radar system operation.

Vehicles (e.g., automobile, truck, construction equipment, farm equipment, automated factory equipment) include a number of sensors to obtain information about the vehicle and its environment. For example, information from sensors may facilitate autonomous operation or operation of semi-autonomous systems (e.g., adaptive cruise control, collision avoidance, automated braking) in addition to alerts to a driver. Exemplary sensors include a radio detection and ranging (radar) system, light detection and ranging (lidar) system, and camera. A radar system may be a single input multiple output (SIMO) system with a single receive element and multiple transmit elements or may be a multiple input multiple output (MIMO) system with multiple receive elements and multiple transmit elements, for example. When multiple transmit elements are used, a transmission scheme such as time division multiple access (TDMA), frequency division multiple access (FDMA), or CDMA is used to ensure that the reflections resulting from the various transmissions are distinguishable. Accordingly, it is desirable to provide a piecewise hyperbolic waveform for CDMA radar system operation.

SUMMARY

In one exemplary embodiment, a method includes generating a family of codewords. Each codeword of the family of codewords including three segments with one of the three segments being a hyperbolic frequency modulation (HFM) segment and two of the three segments being linear frequency modulation (LFM) segments. The method also includes transmitting each codeword of the family of codewords using a different transmit antenna element.

In addition to one or more of the features described herein, the method also includes receiving reflections generated by the transmitting by the different transmit antenna elements at one receive antenna element in a single input multi output (SIMO) system.

In addition to one or more of the features described herein, the method also includes receiving reflections generated by the transmitting by the different transmit antenna elements at two or more receive antenna elements in a multi input multi output (MIMO) system.

In addition to one or more of the features described herein, the transmitting each codeword using the different transmit antenna element is done simultaneously.

In addition to one or more of the features described herein, the generating the family of codewords includes each codeword of the family of codewords having a same bandwidth and duration.

In addition to one or more of the features described herein, the generating the family of codewords includes changing a duration of the LFM segments and of the HFM segment for each codeword of the family of codewords.

In addition to one or more of the features described herein, the generating the family of codewords includes defining the duration of one of the LFM segments as:

$$0 \le t < \frac{M - C(m)}{2M} T,$$

where
M is a number of the codewords of the family of codewords, C(m)=m which is an index of the codeword, and T is duration of the codeword.

In addition to one or more of the features described herein, the generating the family of codewords includes defining the duration of another one of the LFM segments as:

$$\frac{M + C(m)}{2M} T \le t < T.$$

In addition to one or more of the features described herein, the generating the family of codewords includes defining the duration of the HFM segment as:

$$\frac{M - C(m)}{2M} T \le t < \frac{M + C(m)}{2M} T.$$

In addition to one or more of the features described herein, the generating the family of codewords includes generating each codeword of the family of codewords with the one of the LFM segments as a first one of the three segments, the HFM segment as a second one of the three segments, and the other one of the LFM segments as a third one of the three segments.

In another exemplary embodiment, a system includes a transmit portion of a radar system to generate a family of codewords. Each codeword of the family of codewords including three segments with one of the three segments being a hyperbolic frequency modulation (HFM) segment and two of the three segments being linear frequency modulation (LFM) segments. The system also includes a plurality of transmit antenna elements. Each transmit antenna element of the plurality of transmit antenna elements transmits a respective one of the codewords of the family of codewords.

In addition to one or more of the features described herein, the system also includes one receive antenna element to receive reflections generated through transmission by the different transmit antenna elements. The system is a single input multi output (SIMO) radar system in a vehicle.

In addition to one or more of the features described herein, the system also includes two or more receive antenna elements to receive reflections generated through transmission by the different transmit antenna elements. The system is a multi input multi output (MIMO) radar system in a vehicle.

In addition to one or more of the features described herein, the different transmit antenna elements transmit simultaneously.

In addition to one or more of the features described herein, each codeword of the family of codewords has a same bandwidth and duration.

In addition to one or more of the features described herein, a duration of the LFM segments and of the HFM segment for each codeword of the family of codewords is different.

In addition to one or more of the features described herein, the duration of one of the LFM segments is defined as:

$$0 \le t < \frac{M - C(m)}{2M} T,$$

where
M is a number of the codewords of the family of codewords, C(m)=m which is an index of the codeword, and T is duration of the codeword.

In addition to one or more of the features described herein, the duration of another one of the LFM segments is defined as:

$$\frac{M+C(m)}{2M}T \le t < T.$$

In addition to one or more of the features described herein, the duration of the HFM segment is defined as:

$$\frac{M-C(m)}{2M}T \le t < \frac{M+C(m)}{2M}T.$$

In addition to one or more of the features described herein, a processor generates each codeword of the family of codewords with the one of the LFM segments as a first one of the three segments, the HFM segment as a second one of the three segments, and the other one of the LFM segments as a third one of the three segments.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 4 details a piecewise hyperbolic waveform according to one or more embodiments.

DETAILED DESCRIPTION

Figure 1:
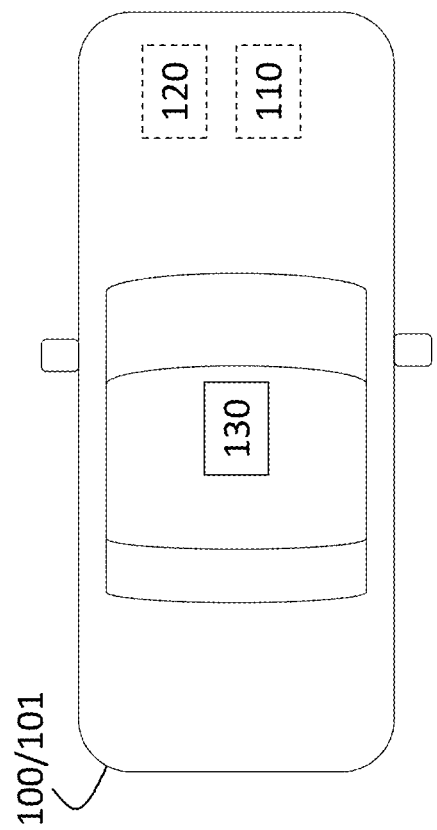
FIG. 1 is a block diagram of a vehicle that uses a piecewise hyperbolic waveform for CDMA radar system operation according to one or more embodiments.

The following description is merely exemplary in nature and is not intended to limit the present disclosure, its application or uses. It should be understood that throughout the drawings, corresponding reference numerals indicate like or corresponding parts and features.

As previously noted, different transmission schemes may be used in SIMO and MIMO radar systems. While TDMA uses temporal separation of transmissions to distinguish the reflections resulting from each, simultaneous transmission from the multiple transmit elements may provide an increased maximum detection range and unambiguous Doppler. A CDMA scheme, which facilitates simultaneous transmissions, may involve phase or frequency modulation to generate the waveform orthogonality that facilitates being able to separate the reflections resulting from the different transmissions. Improvement, relative to other schemes, in the maximal radar detection range and in the maximal unambiguous Doppler (i.e., relative velocity) is proportional to the number of transmitted signals. Each CDMA transmitted signal (i.e., waveform) may be referred to as a codeword, and the set of transmitted signals may be referred to as a coding family or set of codewords. Typical CDMA coding families (e.g., Gold, Hadamard) may have limited dynamic range. This reduces the ability to distinguish multiple objects. Embodiments of the systems and methods detailed herein relate to a piecewise hyperbolic waveform that improves cross-correlation properties such that multiple objects in the field of view (FOV) of the radar system may be distinguished from each other.

In accordance with an exemplary embodiment, FIG. 1 is a block diagram of a vehicle 100 that uses a piecewise hyperbolic waveform for CDMA radar system operation. The exemplary vehicle 100 shown in FIG. 1 is an automobile 101. The vehicle 100 includes a radar system 110 that is further discussed with reference to FIG. 2. The vehicle 100 may additionally include other sensors 130 (e.g., lidar system, camera) that may be arranged anywhere within or on the vehicle 100. The radar system 110 is a SIMO or MIMO radar system that transmits multiple transmit signals 205 (FIG. 2) respectively from multiple transmit elements 210 (FIG. 2) and receives resulting reflections 215 (FIG. 2) at one or more receive elements 220 (FIG. 2).

The vehicle 100 includes a controller 120 that obtains information from the radar system 110 and other sensors 130 and controls one or more operations (e.g., collision avoidance, adaptive cruise control) of the vehicle 100 or provides alerts to the driver as a result. The reflections 215 (FIG. 2) are processed within the radar system 110, by the controller 120, or with a combination of both. A processor of the radar system and the controller 120 include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 2:
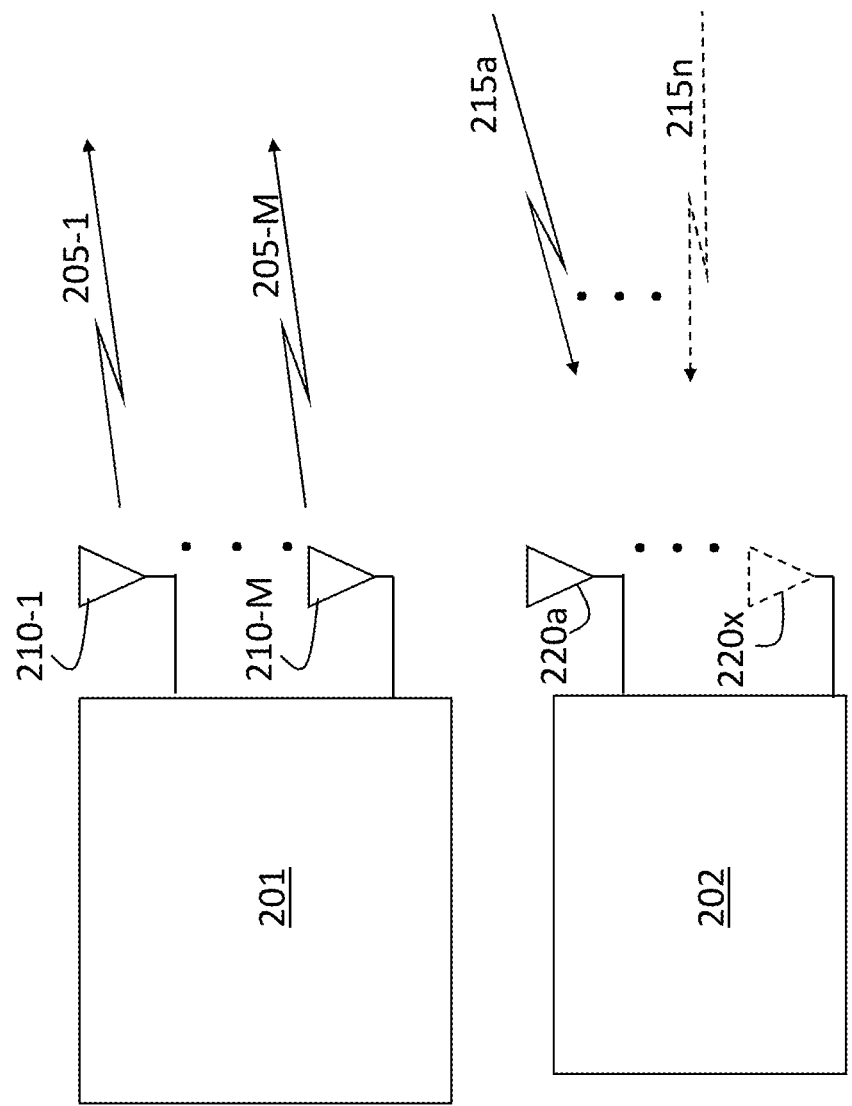
FIG. 2 is a block diagram detailing aspects of a radar system that uses a piecewise hyperbolic waveform for CDMA operation according to one or more embodiments.

FIG. 2 is a block diagram detailing aspects of a radar system that uses a piecewise hyperbolic waveform for CDMA operation according to one or more embodiments. The radar system 110 includes a transmit portion 201 and a receive portion 202. The transmit portion 201 couples to transmit antenna elements 210-1 through 210-M (generally referred to as 210) that respectively emit transmit signals 205-1 through 205-M (generally referred to as 205). The transmit portion 201 generates each of the codewords, according to one or more embodiments, that is transmitted as a transmit signal 205. Generating each codeword according to one or more embodiments requires using a digital to analog convertor (DAC) or a dedicated codewords generator. The codeword and coding family are further discussed with reference to FIGS. 3 and 4. As previously noted, the transmit signals 205 may be transmitted simultaneously by the transmit antenna elements 210.

The receive portion 202 may include receive elements 220a through 220x (generally referred to as 220) in a MIMO system. Only one receive element 220a, according to the example shown in FIG. 2, is part of a SIMO system. Whether the receive portion 202 includes one or more receive elements 220, each receive element 220 receives reflections 215a through 215n (generally referred to as 215). Because a receive element 220 receives the reflections 215 resulting from all the transmit signals 205, the orthogonality among the codewords that make up the transmit signals 205 is necessary to distinguish the reflections and to accurately extract information regarding the object that reflected a transmit signal 205 to generate a reflection 215.

Figure 3:
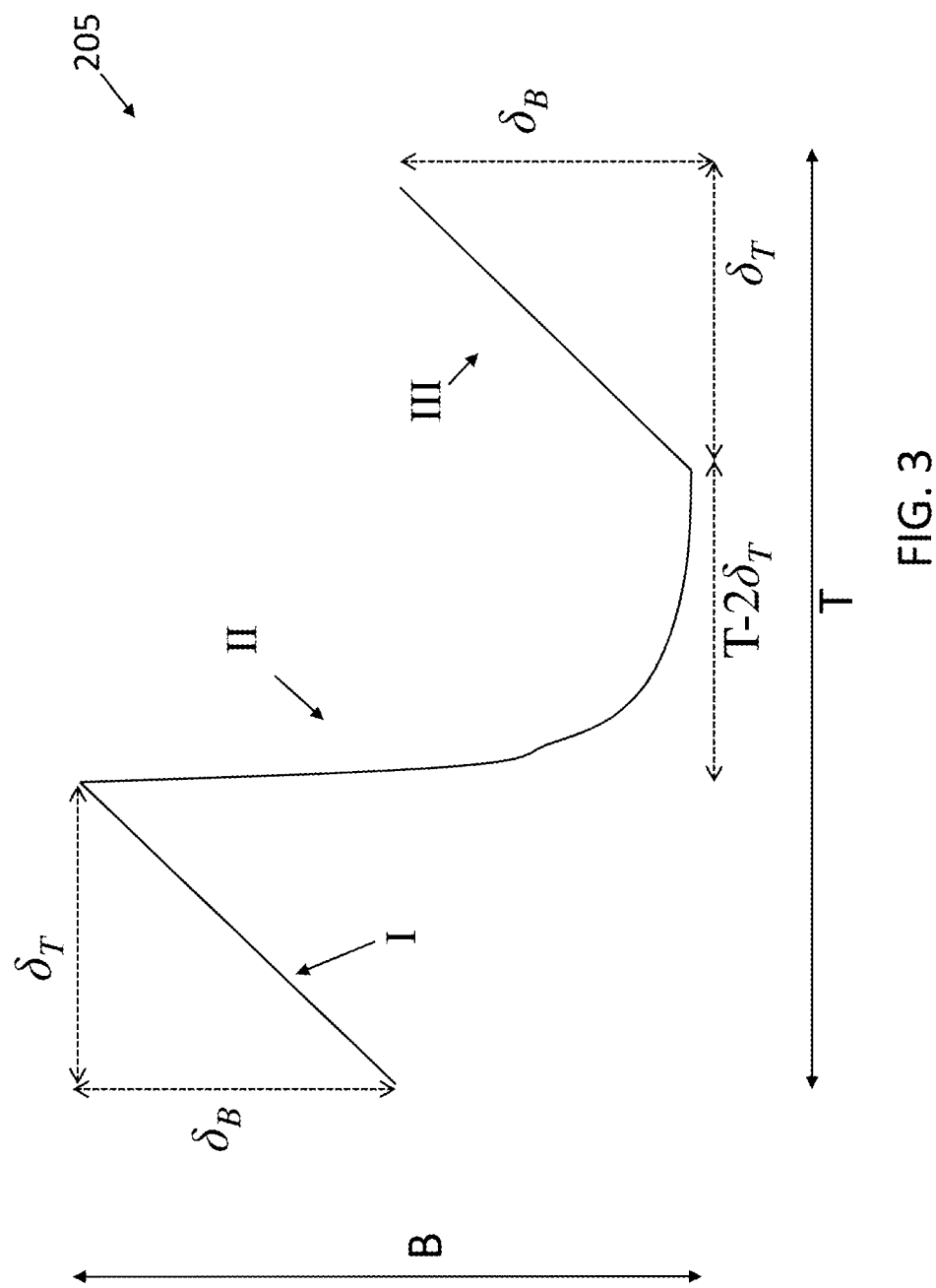
FIG. 3 shows an exemplary piecewise hyperbolic waveform according to one or more embodiments.

FIG. 3 shows an exemplary piecewise hyperbolic waveform emitted as a transmit signal 205 according to one or more embodiments. As shown, the codeword that makes the up transmit signal 205 is made up of three segments I, II, and III. The first and third segments (I and III) are linear frequency modulate (LFM) segments and the second segment (II) is a hyperbolic frequency modulated (HFM) segment. The bandwidth of a codeword is B and the duration is T. The bandwidth of each of the LFM segments is $\delta_B$ ($\leq B$) and the duration of each of the LFM segments (I and III) is $\delta_T$ ($\geq 0$ and $\leq T/2$). The bandwidth of the HFM segment (II) is also B but the period is $T-2\delta_T$ as indicated. According to the exemplary embodiment shown in FIG. 2, the radar system 110 includes M transmit antenna elements 210a through 210M. Thus, there are M different codewords transmitted as transmit signals 205-1 through 205-M. The coding is done through the segment duration. That is, C(m)=m, for example, such that m ∈ [1, 2, . . . , M] defines $\delta_T$ for the m$^{th}$ codeword. The m$^{th}$ codeword is further defined with reference to FIG. 4.

FIG. 4 details a piecewise hyperbolic waveform according to one or more embodiments. The m$^{th}$ codeword $x_m(t)$ (i.e., a given transmit signal 205m) is detailed. Specifically, the three segments I, II, and III that make up the m$^{th}$ codeword $x_m(t)$ are detailed. As shown, the first segment I, which is a LFM segment, is given by:

$$x_{LFM_m}(t, \alpha), 0 \leq t < \frac{M - C(m)}{2M}T \quad [\text{EQ. 1}]$$

As previously noted, there are M total codewords in the family and T is the duration of the codeword. In addition, $\alpha$ is the slope of the LFM segment (i.e., the increase rate in frequency of the LFM segment over the duration of the LFM segment). Also, C(m)=m, which is the index of the segment. The third segment III, which is also an LFM segment, differs in the sign of C(m) from the first segment I. Specifically, the third segment III is given by:

$$x_{LFM_m}(t, \alpha), \frac{M + C(m)}{2M}T \leq t < T \quad [\text{EQ. 2}]$$

The second segment II is the HFM segment and, as shown in FIG. 4, is given by:

$$x_{HFM_m}(t), \frac{M - C(m)}{2M}T \leq t < \frac{M + C(m)}{2M}T \quad [\text{EQ. 3}]$$

Within each codeword, the sign of the HFM segment is opposite to the sign of the LFM segments.

Some parameters are common to all the codewords of the coding family. These include the duration T of each codeword and the bandwidth B, which is the bandwidth of each codeword and of the HFM segment of each codeword. The waveform parameters that are common to all the codewords may also include the bandwidth $\delta_B$ of each LFM segment. Additional orthogonality may be achieved by changing the bandwidth of each LFM segment. Alternately or additionally, additional orthogonality may be achieved by switching the sign of the HFM segment, by using $(-1)^{m+1}$, from one codeword to the next in the coding family. Some parameters are different for each codeword of the coding family. These include C(m), which defines $\delta_T$, the duration of each LFM segment and, as previously noted, can also include bandwidth $\delta_B$.

As previously noted, using the piecewise hyperbolic codewords according to one or more embodiments improves cross-correlation properties. Cross correlation refers to the correlation of a reflection 215 with a transmitted signal 205 that did not result in the reflection 215. A low cross-correlation result relative to an auto-correlation result (i.e., the correlation result of correlating a reflection 215 with the transmitted signal 205 that did result in the reflection 215) facilitates easily identifying an object in the FOV of the radar system 110. As an example, with M=64, the lowest cross-correlation peak sidelobe may be on the order of −45 decibels (dB) and the average may be on the order of −24.5 dB using codewords according to one or more embodiments. On the other hand, using a bi-phase coding family (e.g., Hadamard), the lowest cross-correlation peak sidelobe may be on the order of −17 dB and the average may be on the order of −15 dB. As another example of a conventional coding family, by using a tansec frequency modulation (TSFM) coding family, the lowest cross-correlation peak sidelobe may be on the order of −36 dB and the average may be on the order of −20 dB. Thus, the coding family generated according to one or more embodiments decreases cross-correlation results and thereby increases the dynamic range and the ability to separate multiple objects in the FOV of the radar system 110.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method, comprising:
generating a family of codewords, each codeword of the family of codewords including three segments with one of the three segments being a hyperbolic frequency modulation (HFM) segment and two of the three segments being linear frequency modulation (LFM) segments, wherein the generating the family of codewords includes changing a duration of the LFM segments for each codeword of the family of codewords and defining the duration of one of the LFM segments as:

$$0 \leq t < \frac{M - C(m)}{2M}T,$$

where
M is a number of the codewords of the family of codewords, C(m)=m which is an index of the codeword, and T is duration of the codeword; and
transmitting each codeword of the family of codewords using a different transmit antenna element, wherein a duration of the HFM segment in each codeword of the family of codewords is different.

2. The method according to claim 1, further comprising receiving reflections generated by the transmitting by the different transmit antenna elements at one receive antenna element in a single input multi output (SIMO) system.

3. The method according to claim 1, further comprising receiving reflections generated by the transmitting by the different transmit antenna elements at two or more receive antenna elements in a multi input multi output (MIMO) system.

4. The method according to claim 1, wherein the transmitting each codeword using the different transmit antenna element is done simultaneously.

5. The method according to claim 1, wherein the generating the family of codewords includes each codeword of the family of codewords having a same bandwidth and duration.

6. The method according to claim 1, wherein the generating the family of codewords includes defining the duration of another one of the LFM segments as:

$$\frac{M + C(m)}{2M} T \leq t < T.$$

7. The method according to claim 6, wherein the generating the family of codewords includes defining the duration of the HFM segment as:

$$\frac{M - C(m)}{2M} T \leq t < \frac{M + C(m)}{2M} T.$$

8. The method according to claim 7, wherein the generating the family of codewords includes generating each codeword of the family of codewords with the one of the LFM segments as a first one of the three segments, the HFM segment as a second one of the three segments, and the other one of the LFM segments as a third one of the three segments.

9. A system, comprising:
a transmit portion of a radar system configured to generate a family of codewords, each codeword of the family of codewords including three segments with one of the three segments being a hyperbolic frequency modulation (HFM) segment and two of the three segments being linear frequency modulation (LFM) segments, wherein a duration of the LFM segments for each codeword of the family of codewords is different and the duration of one of the LFM segments is defined as:

$$0 \leq t < \frac{M - C(m)}{2M} T,$$

where
M is a number of the codewords of the family of codewords, C(m)=m which is an index of the codeword, and T is duration of the codeword; and
a plurality of transmit antenna elements, each transmit antenna element of the plurality of transmit antenna elements being configured to transmit a respective one of the codewords of the family of codewords, wherein a duration of the HFM segment in each codeword of the family of codewords is different.

10. The system according to claim 9, further comprising one receive antenna element configured to receive reflections generated through transmission by the different transmit antenna elements, wherein the system is a single input multi output (SIMO) radar system in a vehicle.

11. The system according to claim 9, further comprising two or more receive antenna elements each configured to receive reflections generated through transmission by the different transmit antenna elements, wherein the system is a multi input multi output (MIMO) radar system in a vehicle.

12. The system according to claim 9, wherein the different transmit antenna elements are configured to transmit simultaneously.

13. The system according to claim 9, wherein each codeword of the family of codewords has a same bandwidth and duration.

14. The system according to claim 9, wherein the duration of another one of the LFM segments is defined as:

$$\frac{M + C(m)}{2M} T \leq t < T.$$

15. The system according to claim 14, wherein the duration of the HFM segment is defined as:

$$\frac{M - C(m)}{2M} T \leq t < \frac{M + C(m)}{2M} T.$$

16. The system according to claim 15, wherein a processor is configured to generate each codeword of the family of codewords with the one of the LFM segments as a first one of the three segments, the HFM segment as a second one of the three segments, and the other one of the LFM segments as a third one of the three segments.

* * * * *